UNITED STATES PATENT OFFICE.

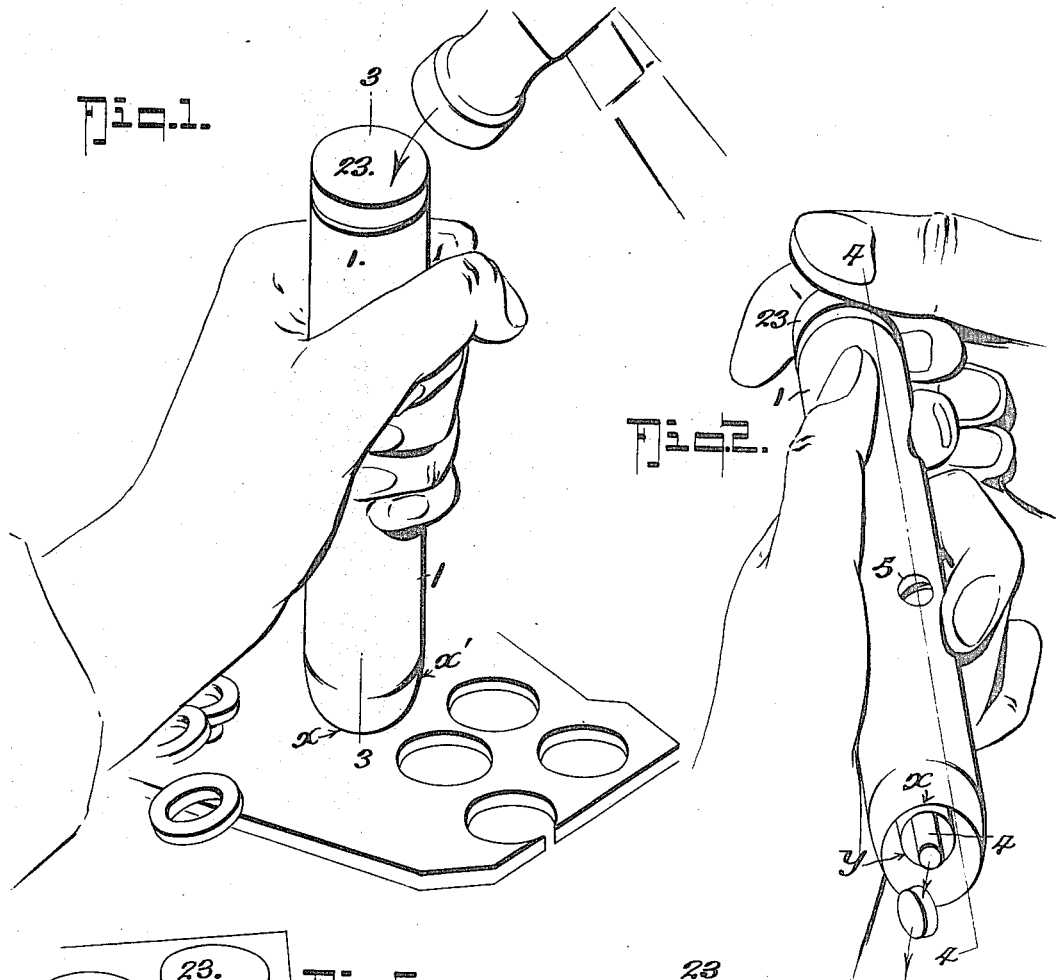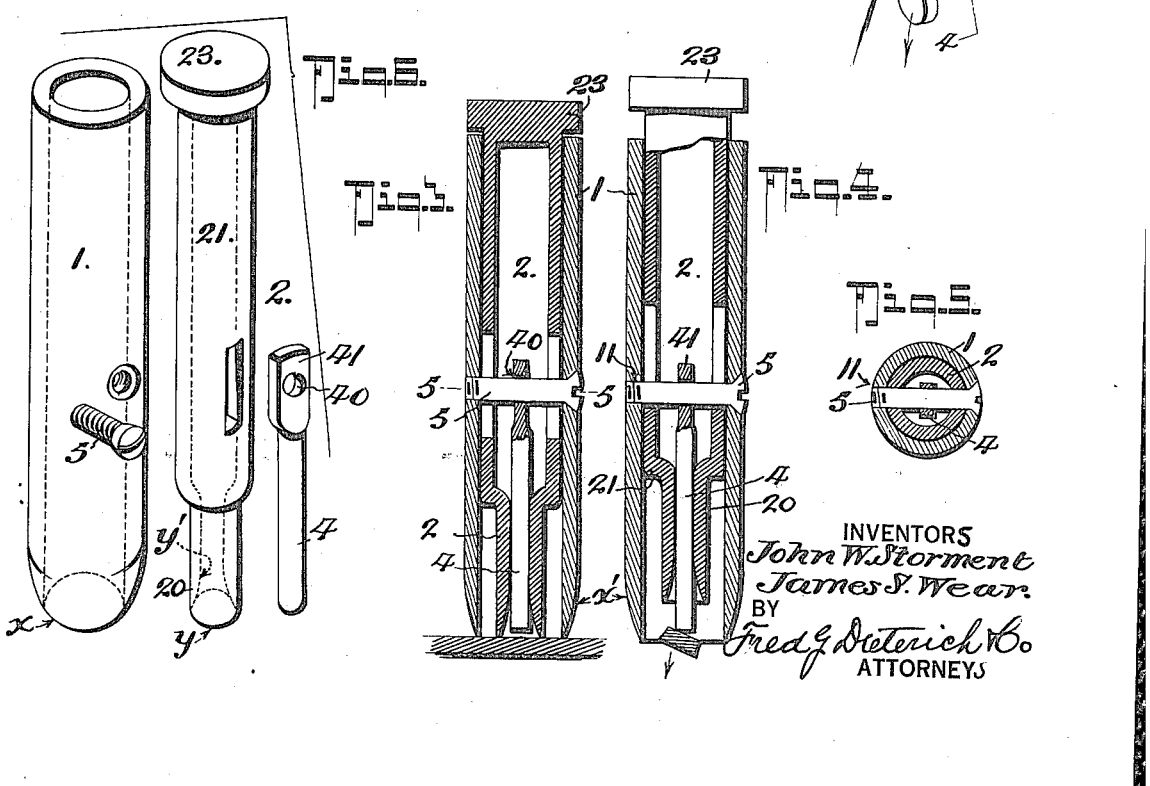

JOHN W. STORMENT AND JAMES S. WEAR, OF DELTA, COLORADO.

GASKET-CUTTER.

1,236,620.  Specification of Letters Patent.  Patented Aug. 14, 1917.

Application filed November 2, 1916. Serial No. 129,144.

*To all whom it may concern:*

Be it known that we, JOHN W. STORMENT and JAMES S. WEAR, residing at Delta, in the county of Delta and State of Colorado, have invented a new and Improved Gasket-Cutter, of which the following is a specification.

This invention has reference to dies for cutting washers, gaskets, and the like, by punching the same from a blank piece or sheet, and it primarily has for its purpose to provide an appliance of the general character stated of a simple and economical construction and in which the parts are especially designed for cutting rubber gaskets for plumbing work, &c.

Another object of our invention is to provide an improved construction of gasket cutter in which is included a simple, easily and quickly manipulated means for effectively discharging the core piece after the gasket is cut by a punching action, means being also included whereby the complete gasket can be readily separated from the cutter.

With other objects in view that will hereinafter appear, our invention embodies the peculiar construction and the novel arrangement of parts, all of which will be hereinafter fully explained, specifically pointed out in the appended claims and illustrated in the accompanying drawing, in which:

Figure 1 is a perspective view of our improved gasket cutter, the same being shown as adjusted for cutting a gasket.

Fig. 2 is a similar view of our invention and the same illustrates the manner in which the appliance is manipulated for ejecting the core piece from the cut or punched gasket.

Fig. 3 is a vertical section of the same on the line 3—3 on Fig. 1.

Fig. 4 is a similar view on the line 4—4 on Fig. 2.

Fig. 5 is a horizontal section on the line 5—5 on Fig. 3, and

Fig. 6 is a perspective view that illustrates the several parts embodied in our invention separated.

In the practical application of our invention, the same embodies two distinct cutting elements in the nature of an outer tubular die 1 and an inner tubular die or cutter 2 that telescopically operates within the outer die 1 and which includes a hollow shank 20 formed with an annular enlargement 21 for engaging the inner wall of the said outer tubular die 1, to thereby guide the inner die as it moves within the member 1 and maintain the said inner and outer cutting or punching edges $x$ and $y$ in proper relation during the operation of cutting the gasket.

By referring more particularly to Fig. 3, it will be seen that the inner face of the outer die and the outer face of the inner die are straight, the outer die having the cutting bevel on the outside tapered downwardly and inwardly, as indicated by $x'$; and the inner die has its inner face beveled inwardly and upwardly, as shown at $y'$.

By reason of forming the cutting edges of the two dies, as stated, provides for cutting the gaskets with clear straight edges, it being understood that as the gasket is cut the core piece becomes wedged within the cutting end of the inner die.

The inner die has a limited vertical movement within the outer tubular die and the upper end of the shank of the said inner die 2 carries a combined handle and striking head 23.

The inner die 2 is of a slightly greater length than the outer tubular die section 1, to thereby project the head 23 a little above the upper end of the outer tubular die section 1 when the parts are held in position for effecting the punching action for cutting the gasket.

By reason of the coöperative arrangement of the two dies, as stated, when the head 23 is struck by a hammer during the act of cutting or punching out the gasket, the inner cutter die 2 will start its punching or cutting action slightly in advance of the punching or cutting action of the outer tubular cutter, which does not begin its punching action until it receives the impact of the head 23 of the inner cutting die.

4 designates a core ejecting element in the nature of a rod pendently hung within the tubular end of the inner die, it being suspended on a screw stud 5 that passes through an aperture 40 in the head end 41 of the rod 4, and through elongated slots 23 in the inner die body.

The head 50 of the screw stud engages a countersunk seat 1 in one side of the outer die body and its threaded end engages a threaded tap 11 in the other side of such body, as is clearly shown in Fig. 5.

From the foregoing description taken in connection with the drawings, the complete construction and the manner of operation of our invention will be clear.

In using the device when it is desired to cut the gasket, the said device is held as shown in Figs. 1 and 3, and when thus applied, in holding the lower ends of the two dies down against the rubber or other blank piece, the inner die, by reason of its greater length, is forced up with its cap member lifted above the top of the outer die, as shown.

After the gasket is cut, as stated, by holding the device as is shown in Fig. 2, and pulling the inner die up, as indicated, the lower end of the inner die rises to a point above the lower end of the ejector rod 5 and hence the cut out or core piece is forced out and the lower end of the inner die is pulled up out of the cut gasket, as indicated in Fig. 4, and by reason thereof, the gasket contracts sufficiently to overcome the wedging tendency at its peripheral edge against the outer die and thereby leaves the gasket free for being readily discharged or removed from the outer die.

What we claim is:

1. In a device of the character described comprising an outer die, an inner die movable longitudinally within the outer die, and a core extractor within the inner die and stationarily held relatively to the outer die.

2. A gasket cutter, comprising an outer tubular cutting die, an inner die telescopically mounted in the outer die and including a tubular cutting end, a core extractor pendently sustained within the tubular portion of the inner die and means for holding the said element stationary with respect to the outer die, the lower end of the said element being adapted to extend through the cutting end of the inner die when the latter is moved upwardly within the outer die.

3. A gasket cutting device comprising inner and outer tubular telescopically arranged cutting dies, the inner die including a shank that projects beyond the top of the outer die and whose upper end terminates in a cap piece that extends over the upper edge of the outer die, the inner face of the cutting end of the inner die being tapered inwardly, the outer face of the outer die being tapered outwardly, the shank portion of the inner die having a pair of elongated slots, a stud mounted on the outer die that extends transversely through the slots of the inner die and a core ejecting element within the inner die pendently hung from the aforesaid stud and adapted when the inner die is moved upwardly within the outer die, to engage and eject the gasket core from the cutting end of the inner die.

JOHN W. STORMENT.
JAMES S. WEAR.